US009459738B2

(12) United States Patent
Lin et al.

(10) Patent No.: US 9,459,738 B2
(45) Date of Patent: Oct. 4, 2016

(54) CALIBRATION FOR PRESSURE EFFECTS ON TOUCH SENSOR PANELS

(75) Inventors: Albert Lin, Sunnyvale, CA (US); Joon Heup Kwon, San Ramon, CA (US)

(73) Assignee: Apple Inc., Cupertino, CA (US)

(*) Notice: Subject to any disclaimer, the term of this patent is extended or adjusted under 35 U.S.C. 154(b) by 502 days.

(21) Appl. No.: 13/490,395

(22) Filed: Jun. 6, 2012

(65) Prior Publication Data
US 2013/0234977 A1 Sep. 12, 2013

Related U.S. Application Data

(60) Provisional application No. 61/607,538, filed on Mar. 6, 2012.

(51) Int. Cl.
*G06F 3/044* (2006.01)
*G06F 3/041* (2006.01)

(52) U.S. Cl.
CPC ............. *G06F 3/044* (2013.01); *G06F 3/0418* (2013.01)

(58) Field of Classification Search
CPC .... G06F 3/0418; G06F 3/045; G06F 3/0488; G06F 3/033; G06F 3/046
USPC ................... 345/173, 178; 178/18.06, 19.07; 324/519, 674
See application file for complete search history.

(56) References Cited

U.S. PATENT DOCUMENTS

| 5,483,261 A | 1/1996 | Yasutake |
|---|---|---|
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 2006/0026521 A1 | 2/2006 | Hotelling et al. |
| 2006/0197753 A1 | 9/2006 | Hotelling |
| 2008/0158178 A1* | 7/2008 | Hotelling et al. ............ 345/173 |
| 2008/0158179 A1* | 7/2008 | Wilson .......................... 345/173 |
| 2011/0234508 A1* | 9/2011 | Oda ........................ G06F 3/044 345/173 |

FOREIGN PATENT DOCUMENTS

| JP | 2000-163031 A | 6/2000 |
|---|---|---|
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Shaheda Abdin
(74) *Attorney, Agent, or Firm* — Morrison & Foerster LLP

(57) ABSTRACT

A touch sensor panel which has been calibrated to be insensitive to effects from an external force applied to the panel is provided. Touch sense circuitry settings are adjusted during a calibration procedure so that when a force is exerted on the device, no change in the touch signal DC level is seen. In this way, the ability of the touch sensor panel to detect touch or proximity events is not affected by a force being applied to the panel.

26 Claims, 13 Drawing Sheets

(56) References Cited

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

CALIBRATION FOR PRESSURE EFFECTS ON TOUCH SENSOR PANELS

CROSS-REFERENCE TO RELATED APPLICATIONS

This application claims the benefit, under 35 U.S.C. §119(e), of U.S. Provisional Patent Application No. 61/607,538, filed Mar. 6, 2012, the contents of which are incorporated by reference herein in their entirety for all purposes.

FIELD OF THE DISCLOSURE

This relates generally to the calibration of touch sensor panels to account for external force exerted on a device that includes the panel, and more particularly to a calibration of the touch signal demodulator phase settings such that overall touch system performance is improved.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens generally allow a user to perform various functions by touching (e.g., physical contact or near-field proximity) the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch screens can be formed from a matrix of drive and sense lines of a substantially transparent conductive material such as Indium Tin Oxide (ITO). The drive and sense lines are often arranged orthogonally with respect to each other on a substantially transparent substrate and are configured to generate signals in response to a touch or proximity event.

Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Due to the mechanical architecture or configuration of a device incorporating the touch screen, an external force applied to the device can affect the touch signals in the touch sensor panel. The amount of force being exerted on the device can vary depending on how the user is holding device and other external environmental conditions. This dynamic force can create signal distortions on the touch sensor panel which can affect the ability of the panel to reliably detect touch and proximity events.

SUMMARY OF THE DISCLOSURE

This relates to touch sensor panels which can be calibrated to be insensitive to changes in touch detection signal levels caused by an external force being applied to the device. Touch sensing circuitry can be tuned so that the direct current (DC) level of the demodulated touch signal is maximized when the device has no pressure applied to it. Each local oscillator corresponding to each touch node of the touch sensor panel can be tuned to maximize the signal. A calculation can then be made to determine a local oscillator setting that can yield a detected touch signal that can have substantially the same DC level whether a force was being applied to the device or no force was being applied to the device.

In other embodiments, the value of the local oscillator phase can be swept and performance under force can be measured. The sweep can be terminated when the performance under force meets a pre-defined specified value.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

This relates to capacitive touch input devices that can be less prone to errors in sensing touch or proximity events due to an externally applied force on the device. Sensing circuitry used to detect the presence of a touch or proximity event can be calibrated during the manufacturing process so that the ability to reliably sense touch and proximity events is not substantially affected by an external force being applied to the device.

Although embodiments disclosed herein may be described and illustrated herein in terms of mutual capacitance touch sensor panels, it should be understood that the embodiments are not so limited, but may additionally be applicable to self-capacitance sensor panels, and both single and multi-touch sensor panels. Furthermore, although embodiments may be described and illustrated herein in terms of an external force modulating an air gap that exists between a touch sensor panel and a display such as an LCD, it should be understood that embodiments are not so limited, but are additionally applicable to any effect that an external force can have on the fidelity of touch and proximity signals of a touch sensor panel including changes in capacitance and resistance or any other property that has an effect on the fidelity of touch and proximity signals. Additionally while embodiments may be described and illustrated for test fixtures that utilize non-conductive probes, it should be understood that embodiments are not so limited, but are additionally applicable to test fixtures that utilize conductive probes. Also while embodiments may be described and illustrated for touch devices that include transparent touch screens, it should be understood that embodiments are not so limited, but are additionally applicable to touch input devices with non-transparent touch screens, such as track pads.

Figure 1:
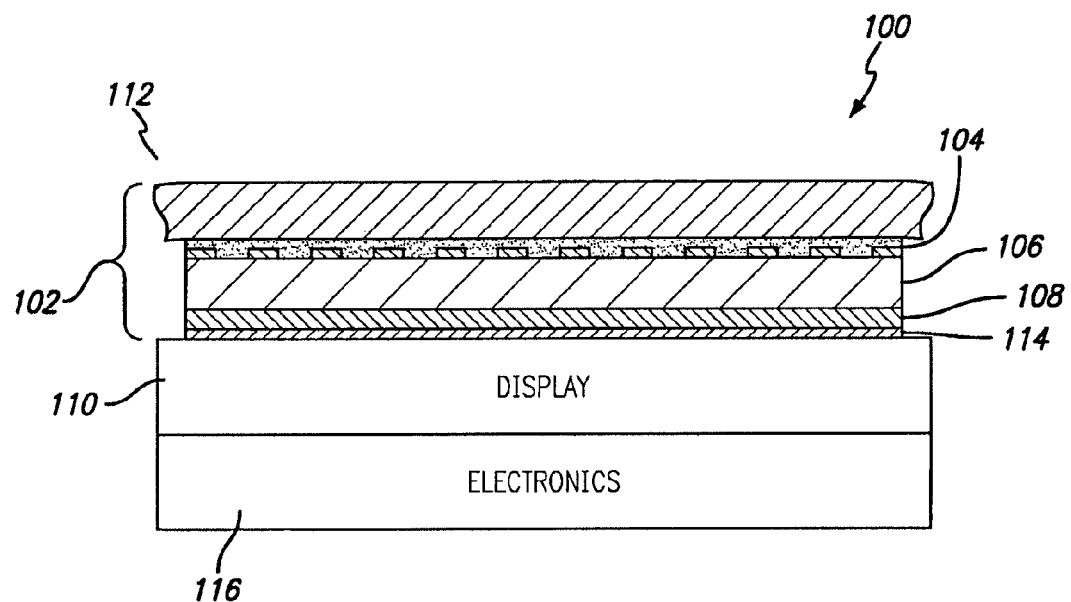
FIG. 1 illustrates an exemplary mutual capacitance touch sensing system according to one disclosed embodiment of the disclosure.

FIG. 1 illustrates an exemplary touch screen sensor panel stack-up 100 that can be formed according to one disclosed embodiment. Touch sensor panel 102 can include a substrate 106 which supports a sense line layer 104 on one side thereof and a drive line layer 108 on the other side thereof. The substrate 106 can act as a dielectric layer between the sense line layer 104 and the drive line layer 108. In some embodiments, the position of the drive and sense line layers may be reversed such that the drive layer is positioned on the top side of the substrate layer 106 and the sense layer on the bottom side. The drive line layer can contain a plurality of touch drive lines disposed in a first direction, and the sense line layer can contain a plurality of sense lines disposed in a second direction that can, in some embodiments, be perpendicular to the drive lines. The plurality of drive and sense lines may be made from a substantially transparent conductive material such as indium tin oxide (ITO), so as not to obscure the display 110 which can be stacked beneath the touch sensor panel and can be attached to the touch sensor panel by a pressure sensitive adhesive layer 114. Finally, the touch sensor panel may include a cover material 112, which may be formed from glass, plastic or other material.

Figure 2:
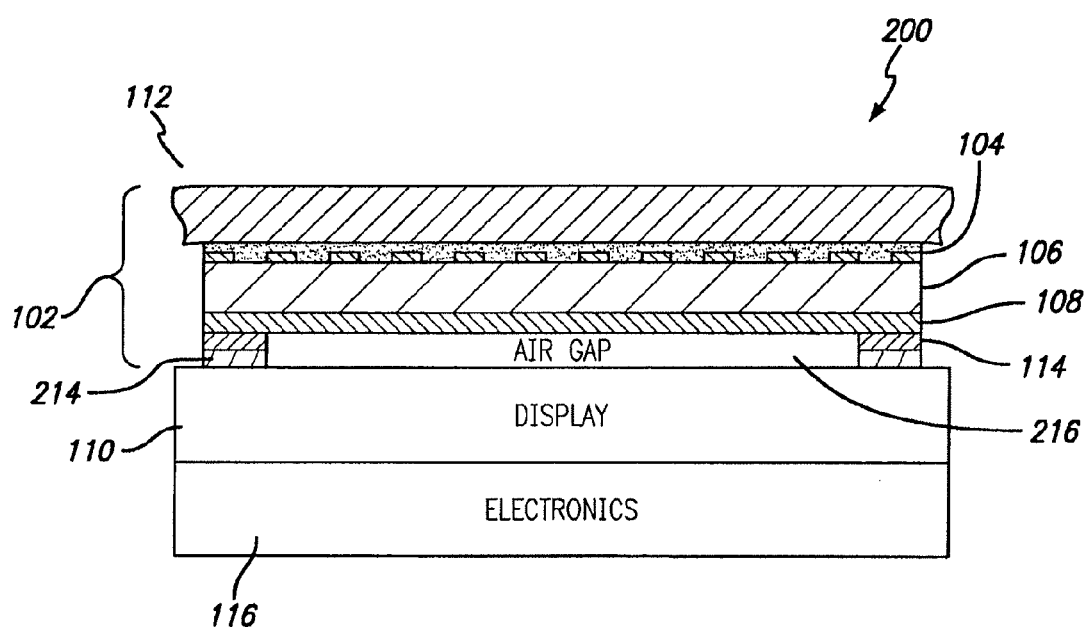
FIG. 2 illustrates an exemplary touch screen sensor panel stack-up with rows and columns that can be formed on the back side of a cover glass according to one embodiment of the disclosure.

FIG. 2 illustrates another exemplary touch screen sensor panel stack-up 200 that can contain all of the features previously described in FIG. 1. In addition, it is sometimes desirable to insert a ring of urethane foam serving as a sealing gasket (commercially known as Poron) 214 around the edges of the display 110. The Poron may also be secured to the display panel 110 by way of pressure sensitive adhesive. An air gap 216 can be intentionally created so that the bond between display panel 110 and touch sensor panel 102 can be easily broken for the purposes of repair or upgrade. In other embodiments, air gap 216 may be created as a result of the normal mechanical configuration of the stack-up 200, resulting from a bezel surrounding the border of one or both of the display panel 110 and the touch sensor panel 102. In embodiments without an air gap, changes in parasitic capacitive coupling between the touch sensor panel and the display panel may be caused by compression of material connecting the two panels. In other embodiments, the air gap 216 may be replaced by a material that changes shape when a force is exerted upon it.

Figure 3:
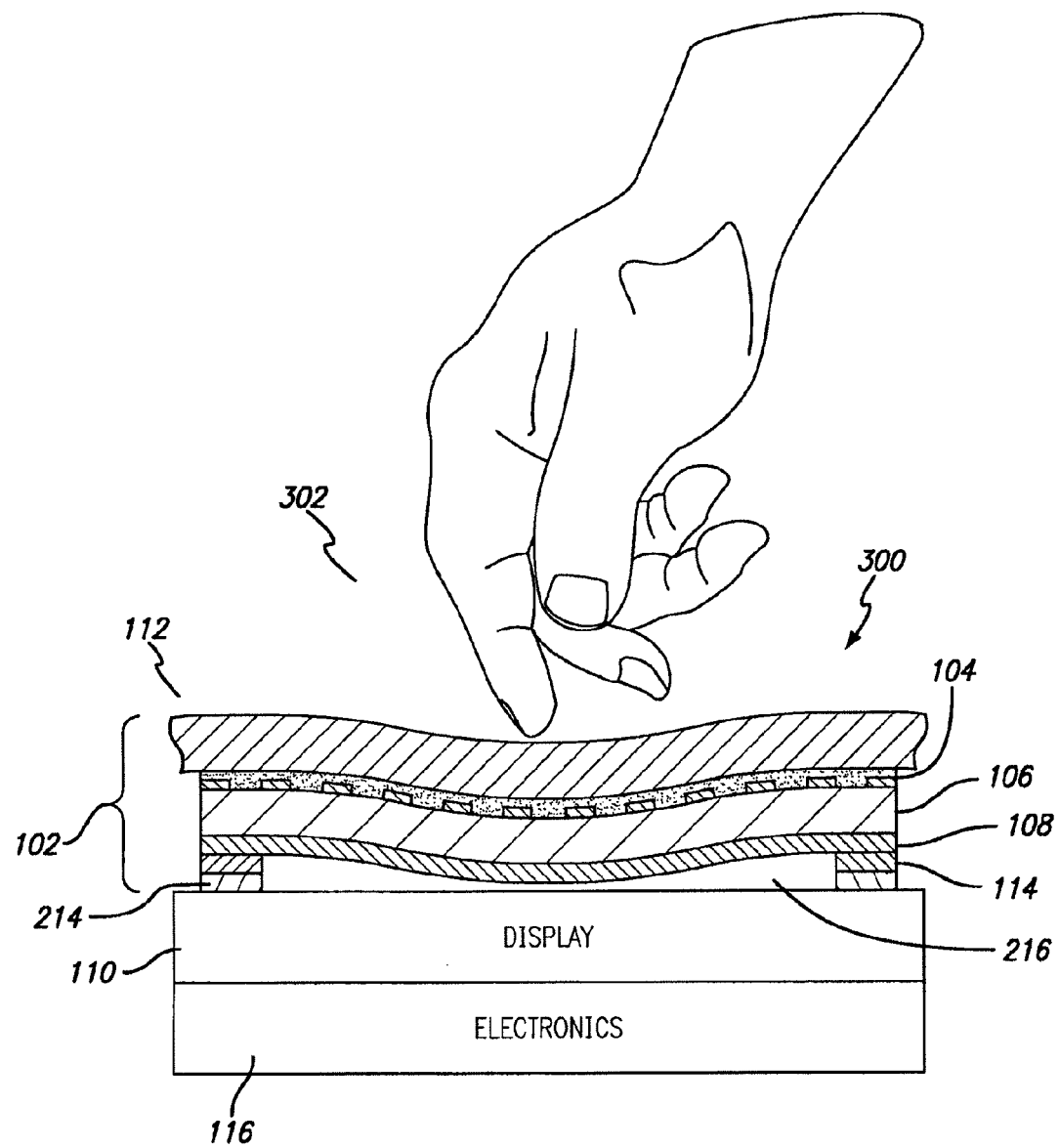
FIG. 3 illustrates an exemplary touch screen sensor panel stack up when an external force is exerted on the top cover glass according to embodiments of the disclosure.

FIG. 3 illustrates the effect of an external force 302, which can be caused either by a user hand as illustrated or by some other external object such as another body part, a stylus, or the like. When force 302 is applied to the touch screen stack-up 300, touch sensor panel 102, which can possess a certain degree of flexibility, can flex (not shown to scale), causing a slight alteration to its shape. This alteration to the shape of touch sensor panel 102 can cause a corresponding change in the shape of air gap 216. The amount of the change in shape can be dependent upon many factors including but not limited to, the amount of force 302 exerted, the thickness of touch sensor panel 102, the material used to produce touch sensor panel, the size and location of air gap 216, the size of Poron layer 214 and finally the thickness and material of display panel 110.

Figure 4:
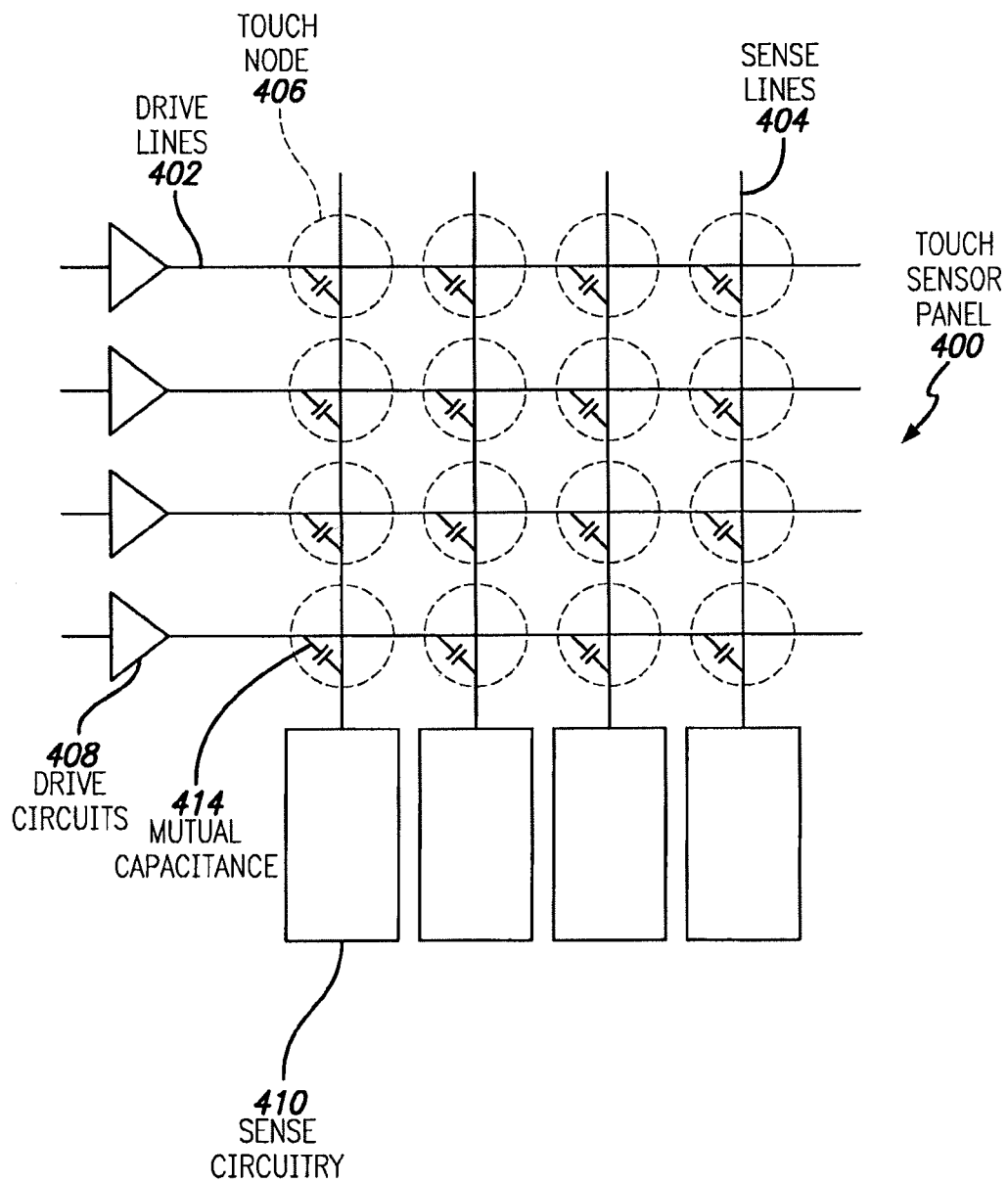
FIG. 4 illustrates an exemplary touch sensor panel according to some embodiments of the disclosure.

A change in the shape of air gap 216 can affect the touch sensor panel's ability to accurately sense touch and proximity events. FIG. 4 illustrates an exemplary touch sensor panel 400 according to some embodiments of the disclosure. Touch sensor panel 400 can include an array of touch nodes 406 that can be formed by a two-layer electrode structure separated by a dielectric material such as the one illustrated in FIGS. 1-3. One layer of electrodes can comprise a plurality of drive lines 402 positioned substantially perpendicular to another layer of electrodes which can comprise a plurality of sense lines 404, with each of the nodes 406 having an associated mutual capacitance 414 (also referred to as coupling capacitance). The drive lines 402 and sense lines 404 cross over each other in different planes separated from one another by a dielectric. Alternatively, in other embodiments the drive lines 402 and sense lines 404 can be formed by a one-layer electrode structure.

Drive lines 402 (also referred to as rows, row traces, or row electrodes) can be activated by a stimulation signal provided by respective drive circuits 408. Each of the drive circuits 408 can include an alternating current (AC) voltage source referred to as a stimulation signal source. To sense touch event(s) on the touch sensor panel 400, one or more of the drive lines 402 can be stimulated by the drive circuits 408, and the sense circuitry 410 can detect the resulting voltage values from the sense lines 404. The voltage values can be indicative of a finger or object altering charge from the mutual capacitance signal. The detected voltage values can be representative of node touch output values, with changes to those output values indicating the node locations 406 where the touch events occurred and the amount of touch that occurred at those location(s).

Figure 5:
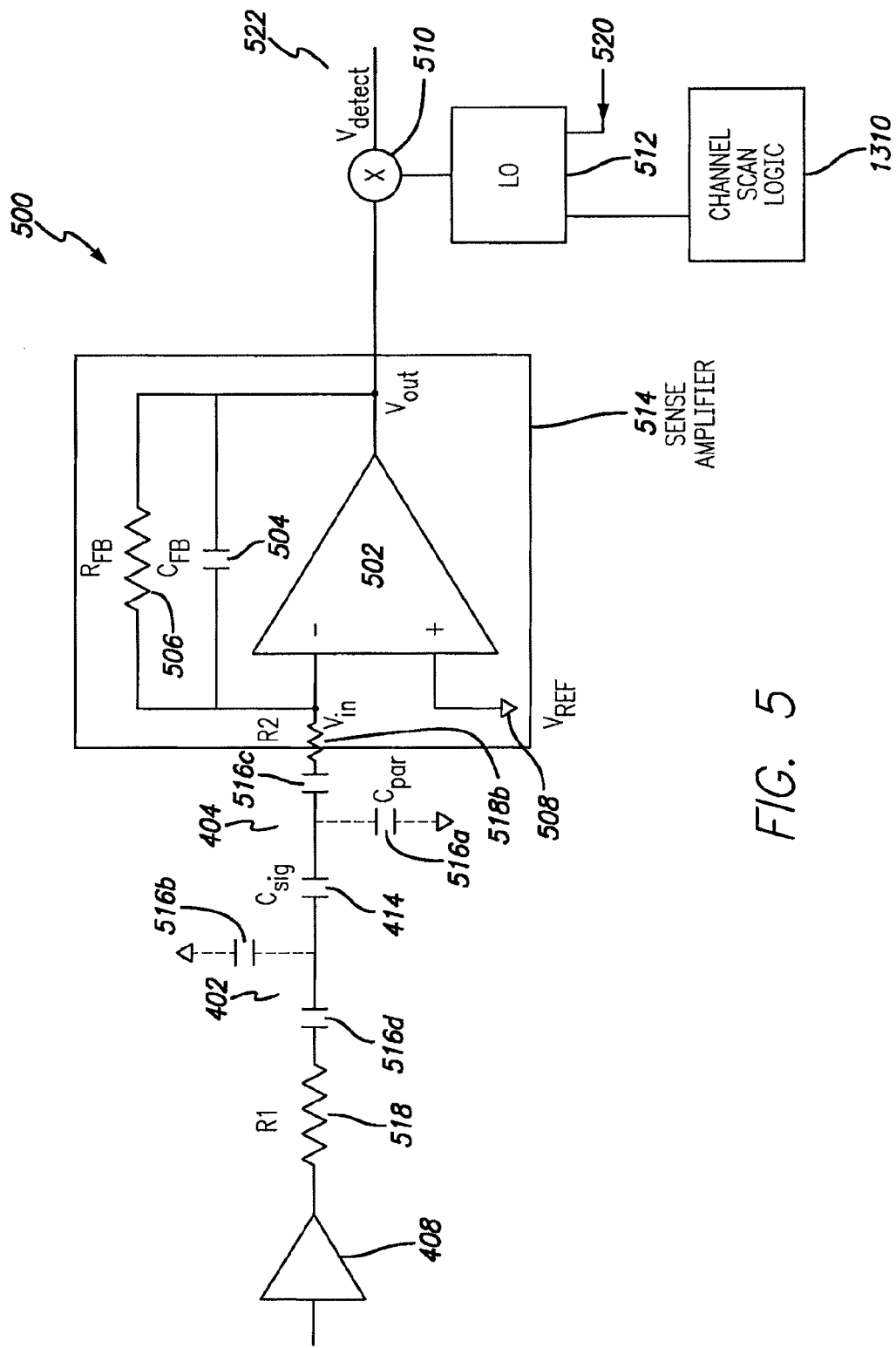
FIG. 5 illustrates an exemplary touch signal sensing circuit according to one embodiment of the disclosure.

FIG. 5 illustrates an exemplary sense circuit 500, which is an example of the sense circuit 410 of FIG. 4. Drive circuit 408 can produce drive signals (also referred to as stimulation signals Vstim), which can be transmitted on drive lines 402 that contain a line resistance 518 and coupled onto sense lines 404 due to mutual capacitance 414 (referred to as Csig) between the drive and sense lines. The coupled signal can then be received by sense amplifier 514. Sense amplifier 514 can include operational amplifier 502, and at least one of a feedback resistor 506 and a feedback capacitor 504. FIG. 5 is shown for the general case in which both resistive and capacitive feedback elements are utilized. The signal can be inputted into the inverting input (referred to as Vin) of the operational amplifier 502, and the non-inverting input can, in some embodiments, be tied to a reference voltage Vref at 508. If Vstim is a sinusoidal signal (such as an AC signal), the output of the amplifier, Vout, should also be a sinusoid. Moreover, Vout should be a sinusoid that possesses the same frequency as Vstim with a phase shift. For example:

if $Vstim = A \sin(\omega t) \rightarrow Vout = B \sin(\omega t + \phi)$ where $\phi$=phase shift The value of $\phi$ can be influenced by many factors, including any parasitic capacitance 516 (Cpar) encountered by the sense circuit 500. Parasitic capacitance 516 can be characterized as any capacitance other than the mutual capacitance 414 between the drive lines 402 and sense lines 404 which is the capacitance of interest. The parasitic capacitance may be connected in series with Csig as shown at 516c and 516d or may alternatively be connected in parallel as shown at 516a or 516b. The number 516 is used to represent any one or more of the parasitic capacitances 516a-516d. There can be multiple factors that contribute to the value of parasitic capacitance 516 including coupling with metallic elements within the display 110 and variations in the air gap 216 or other resilient members of the stack up 100 (e.g., gaskets, pressure sensitive adhesive) under applied force conditions. As shown in FIG. 5, Vout can then be heterodyned by being fed into a multiplier 510, and multiplied with a local oscillator 512 to produce Vdetect 522 The direct current (DC) portion of Vdetect 522 can be used to detect if a touch or proximity event has occurred. Any phase mismatch between the local oscillator 512 and Vout caused by force being applied to the device can produce a distortion of Vdetect which in turn can cause errors in touch detection. Such errors can include detecting ghost touches (or positive pixel event) (when a touch signal is detected at a location where no physical touch is present) or detecting negative pixel events by failing to detect touch events that are occurring. As indicated above, the phase mismatch between Vout and the output of local oscillator 512 can be caused in part by parasitic capacitance. Since the parasitic capacitance may, in some embodiments, be caused in part by local or global variations in the width of air gap 216 of panel stack-up 200, any local or global changes to the width of the air gap such as those caused by external force 302 can also cause a change to the parasitic capacitance 516. This dynamically changing parasitic capacitance 516 can make touch and proximity event detection less reliable.

One method to reduce the effect that external force 302 has on the reliability of touch detection is to "tune" local oscillator 512 such that the phase of the local oscillator signal is either equal or close to being equal to the phase of the output signal of sense amplifier 514, Vout. For this purpose, a phase control signal can be supplied to the local oscillator 512 along line 520 to modify the phase of the local oscillator 512, and the output of the multiplier 510 is taken along line 522. Tuning the phase of the local oscillator 512 during a no force contact event such that the phase of the local oscillator is equal to or substantially equal to the phase of the output signal Vout of the sense amplifier 514 results in distortions in Vdetect caused by parasitic capacitance to be minimized in the no force condition. However, since in actual use, external force 302 can change over time depending on contact with the touch panel 100, the value of parasitic capacitance 516 can be constantly changing. Moreover, it can be difficult to separate out capacitive changes resulting solely from conducive capacitive touching (i.e., light touching with a finger with no substantial force) from those capacitive changes resulting solely from force inducted distortions of the air gap. As a result, it can be difficult to effectively tune local oscillator 512 to minimize errors in touch sensing due to external force when the touch pad is in use. One method to tune the local oscillator 512 to account for the effects of external force is to calibrate the phase of the local oscillator during the manufacturing process to account for the force effect. Alternatively, the phase of the local oscillator 512 can be kept constant while the phase of Vstim is calibrated in order to achieve the same effect as calibrating the phase of the local oscillator. This calibration of Vstim can also take place during the manufacturing process.

Figure 6:
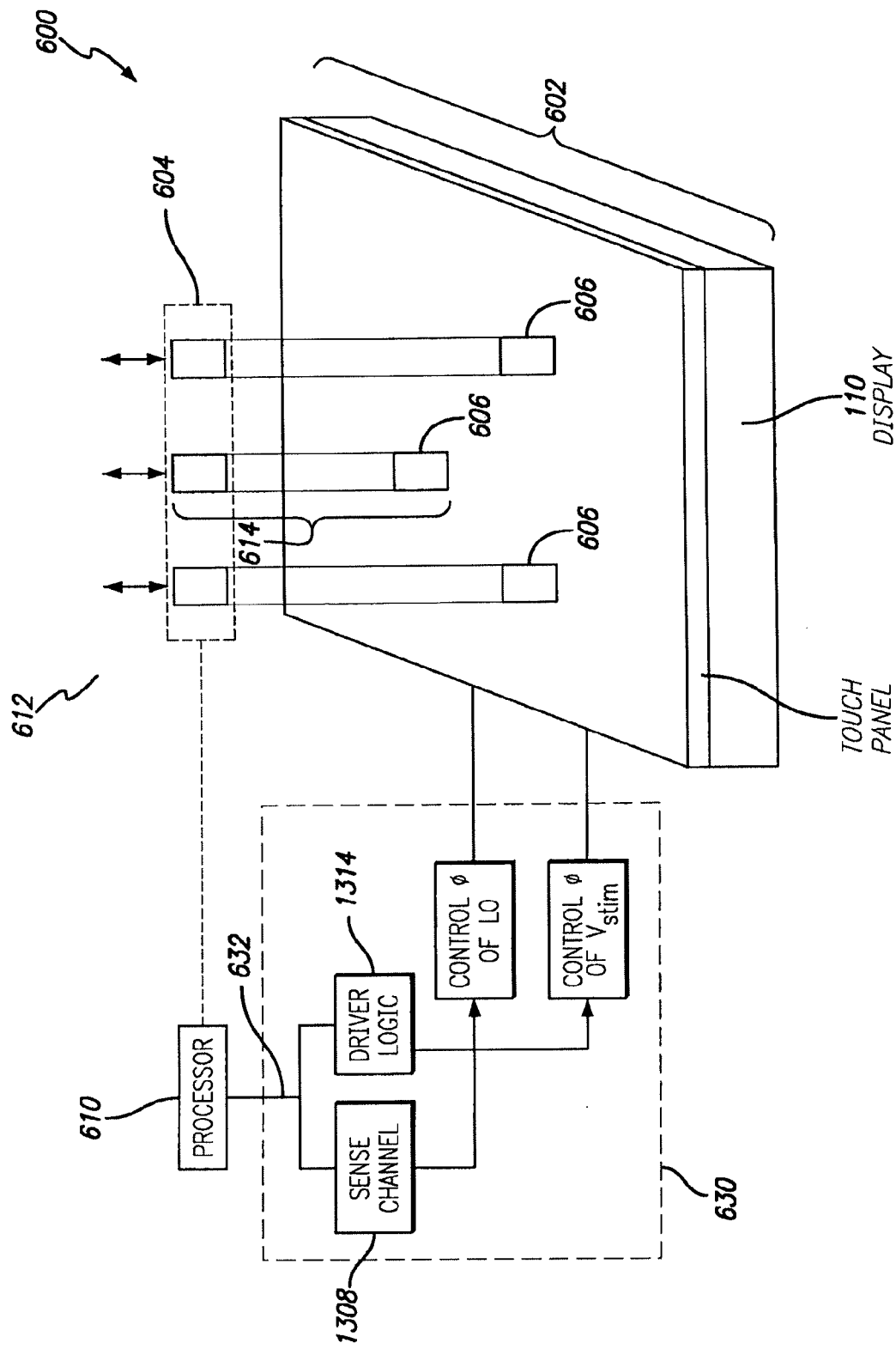
FIG. 6 illustrates an exemplary force test and calibration fixture according to one embodiment of the disclosure.

FIG. 6 illustrates an exemplary force test and calibration fixture 600 according to one embodiment of the disclosure. Actuators 604 can apply a force 612 to probes 614 at multiple force points on touch sensor panel stack up 602. The stack up 602, which is part of the device under test, may be of the same construction as described in reference to FIGS. 1-3. The amount of force and the number and location of the force points may be determined empirically by observing how the device is used by the average user. The probes 614 can be non-conductive and have non-conductive tips 606 that make contact with the device to define the force points. The non-conductive tips 606 can be made of a resilient material such as rubber or a soft material such as felt to prevent scratching of the touch panel during testing. The non-conductive probes 614 and non-conductive tips 606 can be used to ensure that the force being applied does not create a signal that would otherwise be interpreted as a touch signal from a user, since a human operator would normally provide a conductive path via a capacitive coupling to ground upon touching the touch panel, and such touching can change the capacitive coupling Csig between the touch drive and touch sense lines even without actually distorting any air gap between the touch sensor panel and the display panel. All of the probes may be applied simultaneously to the device under test or may be applied one at a time, two at a time, etc. Generally, it may be desired to calibrate for a worst case scenario and thus, in some embodiments, all of the probes can be used at the same time to apply force to the device under test. The stack up 602 can be of the same construction as described in FIGS. 2-5. The dotted line representing circuit components at 630 can represent components that are part of the device under test (mobile phone, tablet, touch screen device, etc.) and may be disposed on a mother or logic board (not shown) or other electronics supporting substrate within the device under test. A processor 610 can be connected to the circuit components 630 along lines 632 so as to provide control signals for receiving the Vdetect signals and to sweep the phases of the Vstim waveforms through the driver logic 1314 or the local oscillator waveforms through the sense channel 1308. While FIG. 6 shows processor 610 as external to the device, processor 610 can be either located externally to the device under test, or can be located within the device under test.

Figure 7:
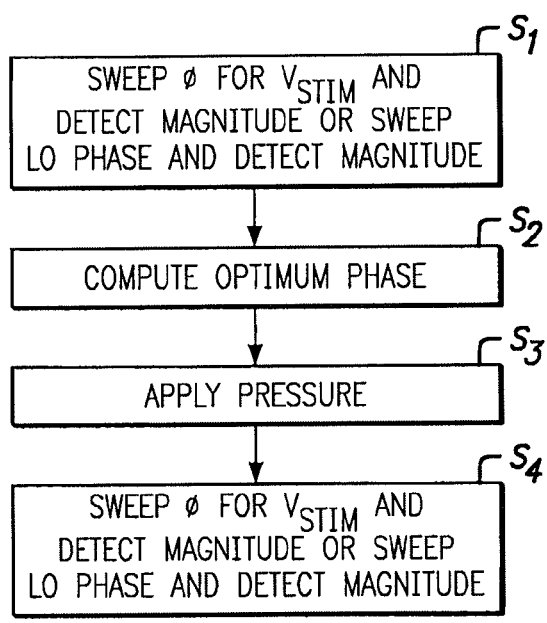
FIG. 7 illustrates a flow diagram that outlines the exemplary steps a text fixture processor can take to calibrate a device for force effects according to embodiments of the disclosure.

FIG. 7 illustrates exemplary steps that can be taken by processor 610 to calibrate the phase of local oscillator 512 for a particular touch node. At step S1, while no pressure is being applied to the touch sensor panel, processor 610 can cause a sense circuit to sweep the local oscillator phase corresponding to the touch node response being measured by utilizing the control signal applied to the local oscillator 512 along line 520. During the sweep, the processor can measure the DC level of Vdetect for each value of local oscillator 520 phase inputted during the sweep.

Figure 8:
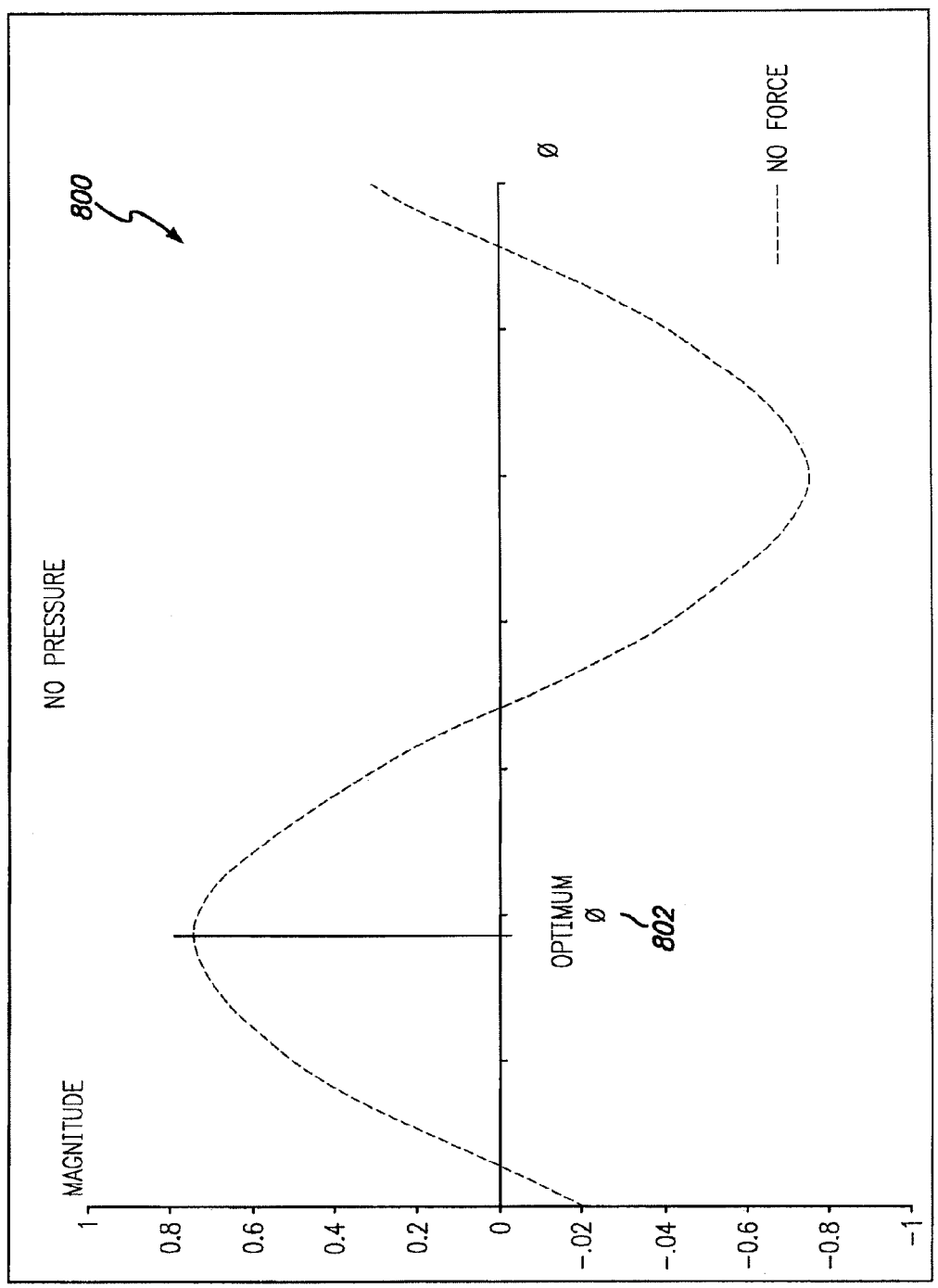
FIG. 8 illustrates a graph of an exemplary demodulated signal DC level as a function of tuned demodulator phase when no force is being exerted on the device according to embodiments of the disclosure.

FIG. 8 illustrates a graph of an exemplary demodulated signal DC level as a function of tuned local oscillator phase for one particular touch node when no force is being exerted on the device according to one embodiment of the disclosure. The x-axis of graph 800 represents the value of the phase shift of local oscillator 512 tuned by processor 610. The y-axis represents the relative DC level of Vdetect measured when the local oscillator 512 is tuned to a particular phase. As exhibited in FIG. 8, as the local oscillator 512 phase value is swept, the DC level of the detected signal varies in a sinusoidal and periodic manner, and this DC level versus phase information can be stored. The processor 610 at S2 of FIG. 7 can then examine the collected data and determine an "optimum" phase setting 802 for the local oscillator 512 such that the particular touch node being analyzed can have a maximum signal DC level. This process of determining the optimum phase setting 802 can be repeated for each touch node of the touch sensor panel and the results can be stored by the processor 610. In one embodiment, processor 610 can set each local oscillator 512 on a node-by-node basis such that the phase is set to the calculated optimum value each time a node associated with that oscillator is being measured. If local oscillators are shared and multiplexed in use, the processor 610 can store a local table within RAM 1312 (FIG. 13) of the channel scan logic 1310 of the stack up such that the ideal phase can be read out and used to set the local oscillator on an as needed basis, that is, during the local oscillator's use when heterodyning each node. When the relative phases between the local oscillator and the Vout waveforms are being swept by changing the drive stimulation signals Vstim, the processor 619 can store the Vstim phase angles into the RAM 1312, and the channel scan logic 1310 and driver logic 1314 can use these phase angles to adjust Vstim on a row by row basis. More generally, the RAM 1312 may store phase angle settings for the Vstim waveforms for each pixel such that the phase angle can be read out of the RAM 1312 for each row driven by Vstim and for each column sensed by the sense channel.

Figure 9:
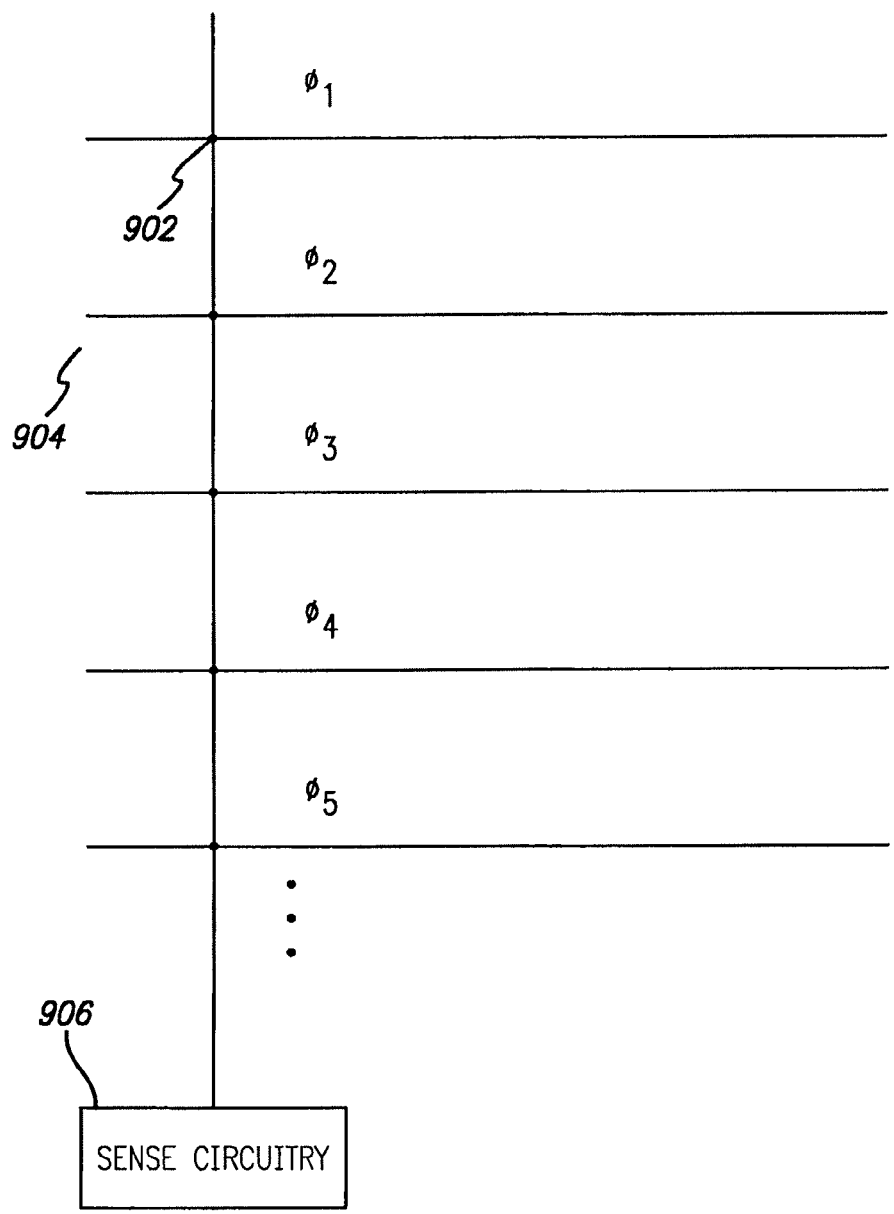
FIG. 9 illustrates an exemplary column trace of a mutual capacitance touch sensing system and corresponding sense circuitry according to embodiments of the disclosure.

FIG. 9 illustrates an exemplary column trace of a mutual capacitance touch sensing system and corresponding sense circuitry according to embodiments of the disclosure. In some embodiments, multiple touch nodes 902 can share a common set of sense circuitry. In this case, the drive lines can be sequentially scanned such that the sense circuitry 906 is only detecting signals corresponding to one touch node at a time. For example, FIG. 9 shows a set of touch nodes 902 in one column that share sense circuitry 906. Each touch node 902 has an optimum phase setting 802 as computed by processor 610. However, since the touch nodes 902 in one column share the same local oscillator, in some embodiments processor 610 may not be able to simply set a phase shift value to the local oscillator 512 corresponding to one optimum phase, since there are multiple optimum phases corresponding to the multiple touch nodes on a particular column. Therefore, in some embodiments, a value for the local oscillator phase of a particular column can be computed such that the error between the computed optimum phases for each touch node is minimized in relation to the value of phase programmed into the local oscillator for a particular column.

After the optimum phase settings are determined while no force is being exerted on the device, the force can be applied at step S3 of FIG. 7. The processor 610 at S4 can sweep the local oscillator's 512 phase and determine the DC level of Vdetect as a function of local oscillator phase when the force is being applied. In some embodiments, step S4 can be performed prior to steps S1.

Figure 10:
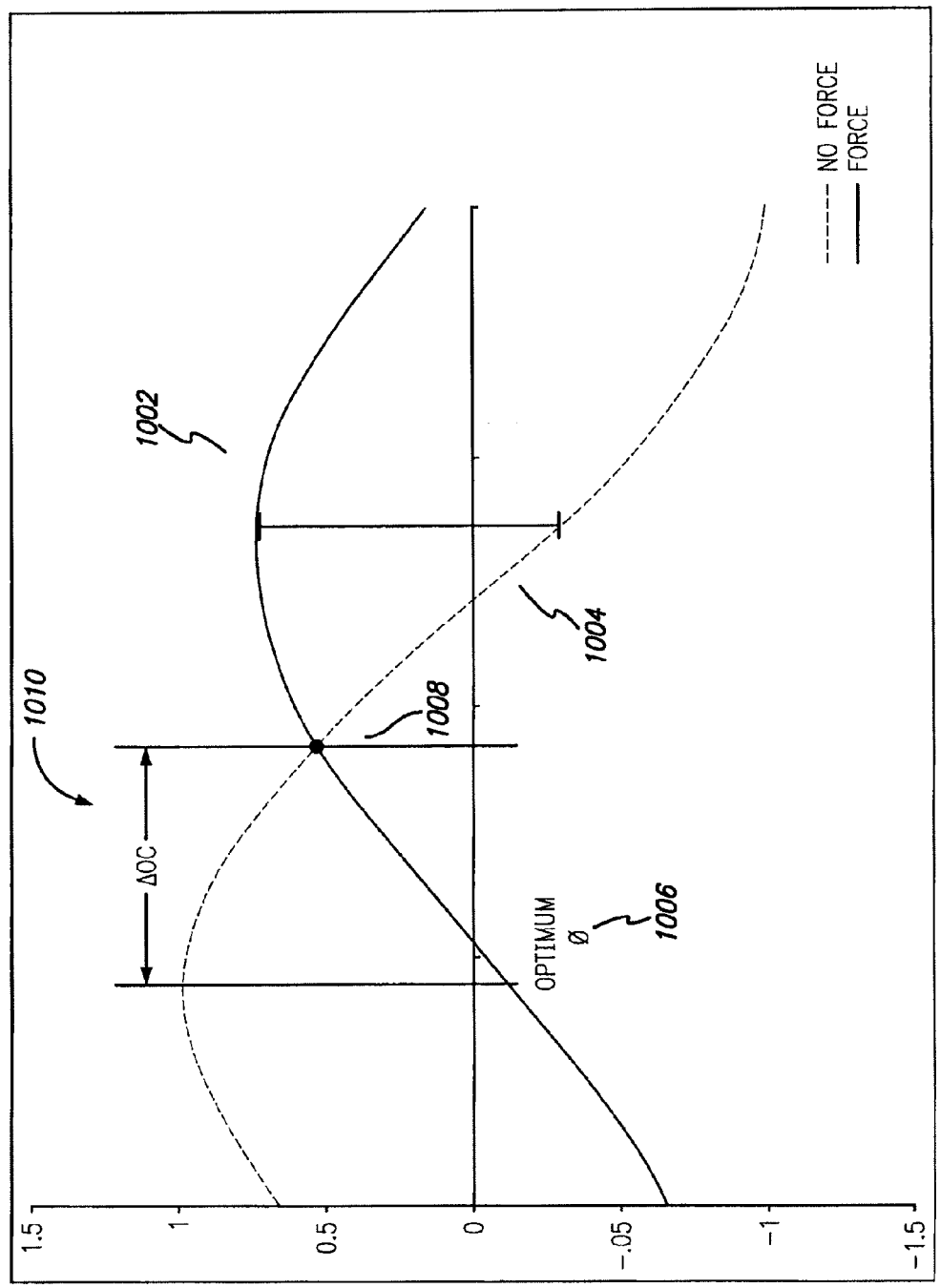
FIG. 10 illustrates a graph of an exemplary demodulated signal DC level as a function of tuned demodulator phase under both force and no force conditions according to embodiments of the disclosure.

FIG. 10 illustrates a plot of exemplary data collected for one particular touch node by processor 610 after step S4 of FIG. 7 is completed. After step S4, two sets of data have been collected. The first is the detected signal DC level as a function of local oscillator phase while the device is under force, as illustrated by curve 1002. The second is the detected signal DC level as a function of local oscillator phase while the device has no force being exerted upon it, as illustrated by curve 1004. An optimum phase 1006 for the no force curve was determined in step S2 of FIG. 7. As shown in FIG. 10, the two curves may differ in both phase, DC level and AC level; however, both are periodic. Thus the two curves 1002 and 1004 will have an intersection point 1008 as determined by the processor. The intersection point 1008 corresponds to a local oscillator 512 phase setting such that the DC level of the detected signal at the particular touch node being measured is the same when the device is under force and when no force is being applied. If the local oscillator is set to this intersection point 1008, or approximately to this intersection point, the device will see either no change in detected signal DC level, or minimal change in detected signal DC level, when the device has force exerted on it, or when there is no force being exerted on the device. Thus, operating the local oscillator at point 1008 means that the effects of force on touch signal DC level are effectively calibrated out. The phase difference between the optimum phase 1006 and the intersection of the force 1002 and no force 1004 curves may be referred to as the over compensation factor ($\Delta OC$) 1010.

In some embodiments in which each touch node has its own local oscillator 512, the local oscillators can simply be set at the calculated over-compensation factor for each touch node and the calibration process is ended. In other embodiments in which multiple touch nodes share a common sense circuitry local oscillator 512, an over compensation factor 1010 can be calculated for each touch node, and then an overcompensation factor for the local oscillator 512 shared by the touch nodes can be set such that the error between the $\Delta OC$ set for local oscillator 512 and the calculated $\Delta OC$ for each touch node is minimized. In other embodiments in which the touch nodes share one demodulator, those touch nodes can be scanned at different times (time multiplexed) such that effectively each touch node can have its own demodulator setting. Thus, when an individual touch node is being stimulated, the local oscillator corresponding to the touch node looks up a value of phase for that node and sets the phase to be that value when that particular node is being analyzed.

Figure 11:
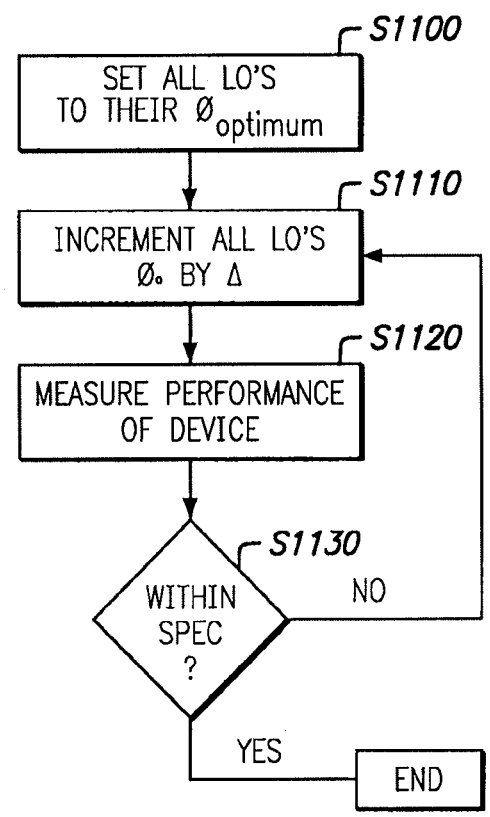
FIG. 11 illustrates a flow diagram of an exemplary process for determining the optimal overcompensation factor applied to the local oscillators of the sense circuitry according to embodiments of the disclosure.
Figure 12:
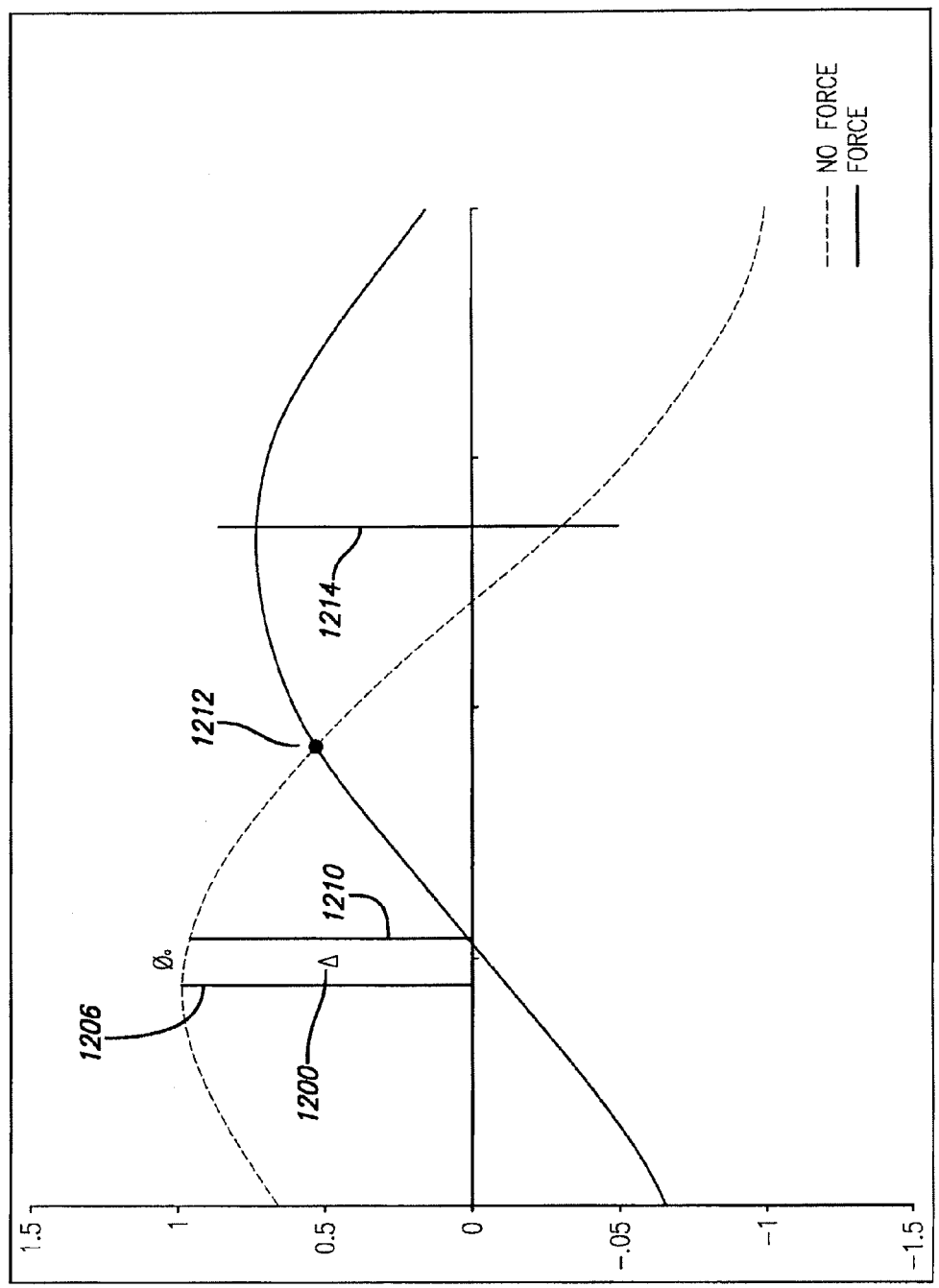
FIG. 12 illustrates an exemplary force and no force response of a demodulated signal in response to the steps taken in the flow diagram of FIG. 11 according to embodiments of the disclosure.

FIG. 11 illustrates a flow diagram for determining an exemplary over compensation factor to apply to the local oscillators of the sense circuitry according to one embodiment of the disclosure. FIG. 12 illustrates a force and no force response of a demodulated signal for a particular touch node. Ideally, when the local oscillator is set to the intersection point 1212, there is no difference in the DC level of the touch signal (Vdetect) between a force and a no force condition. However, when the local oscillator is operating at optimum phase 1206, there is a difference in Vdetect between the force and no force condition. In FIG. 12, if the system is operating at optimum phase 1206, the DC level of Vdetect under a no force condition is greater than the DC level of Vdetect under force. In terms of system performance, since a touch event is signified by a decrease in the DC level of Vdetect, this means that when force is applied to the device, a positive pixel effect (also termed a "ghost touch") can be created such that a touch event at the particular node may be detected when no actual touch is occurring. Alternatively if the local oscillator were set to point 1214, the DC level of Vdetect in a force condition can be higher than the DC level of Vdetect under a no force condition. In terms of system performance, since a touch event is signified by a decrease in the DC level of Vdetect, this means that when force is applied to the device, a touch negative pixel effect may be created such that no touch would be detected even though a touch event is occurring.

At step S1100, all of the local oscillators can be set to the computed optimum phase 1206 as determined above. In some embodiments, the local oscillators can be set to an arbitrary value of phase without reference to the optimum value of the phase, thus omitting step S2 in FIG. 7. At step S1110, all of the local oscillators can be incremented by some Δ 1210. At step S1120, a force performance for the device can be measured. Force performance can be measured in numerous ways; however, force performance can be correlated to the distance between the DC level of Vdetect for a force condition and the DC level of Vdetect for a no force condition at a given local oscillator phase setting. In some embodiments, force performance is measured by determining the number of touch nodes that would yield a positive pixel effect, and computing an energy density of such positive pixels as by summation of squares of the DC level of the positive pixel values (difference between no force and force conditions of Vdetect when the no force curve is greater than the force curve (FIG. 12), and then averaging over the total number of pixels). In other cases, a simple average of the positive pixels and negative pixels separately, or separately summing the positive and negative pixels may be used to measure force performance. Thus, if the system is operating at optimum phase 1206 incremented by a Δ 1208, the difference between a touch signal with force, and a touch signal with no force can determine the force performance of the particular touch node. Ideally, if the local oscillator were operating at intersection point 1212, there would be no difference in the DC level of Vdetect between the force and no force condition. This setting can yield maximum force performance for the touch node. In other embodiments that use self-capacitance to detect touch or proximity events, the presence of a finger or object on the touch pad can cause an increase in self-capacitance. One skilled in the art can recognize that the method described above can be applied to a touch pad that utilizes self-capacitance.

In order to measure force performance of the device, the force performance of a plurality of touch node can be averaged. At S1130 the measured force performance of the device can be compared against a pre-defined specified limit. The pre-defined specified limit can be defined as the worst case force performance tolerable by the system. If it is determined that the computed force performance of the device is within the specified value, the calibration is complete and the process is terminated. If, however, the computed force performance is not within the specified limit, the processor can return to step S1110 and increment the local oscillator phase for each touch node by another value of Δ. The process can repeat until a force performance is reached that is within the specified limit, or no such condition exists, in which the case the calibration procedure "fails" the unit.

Figure 13:
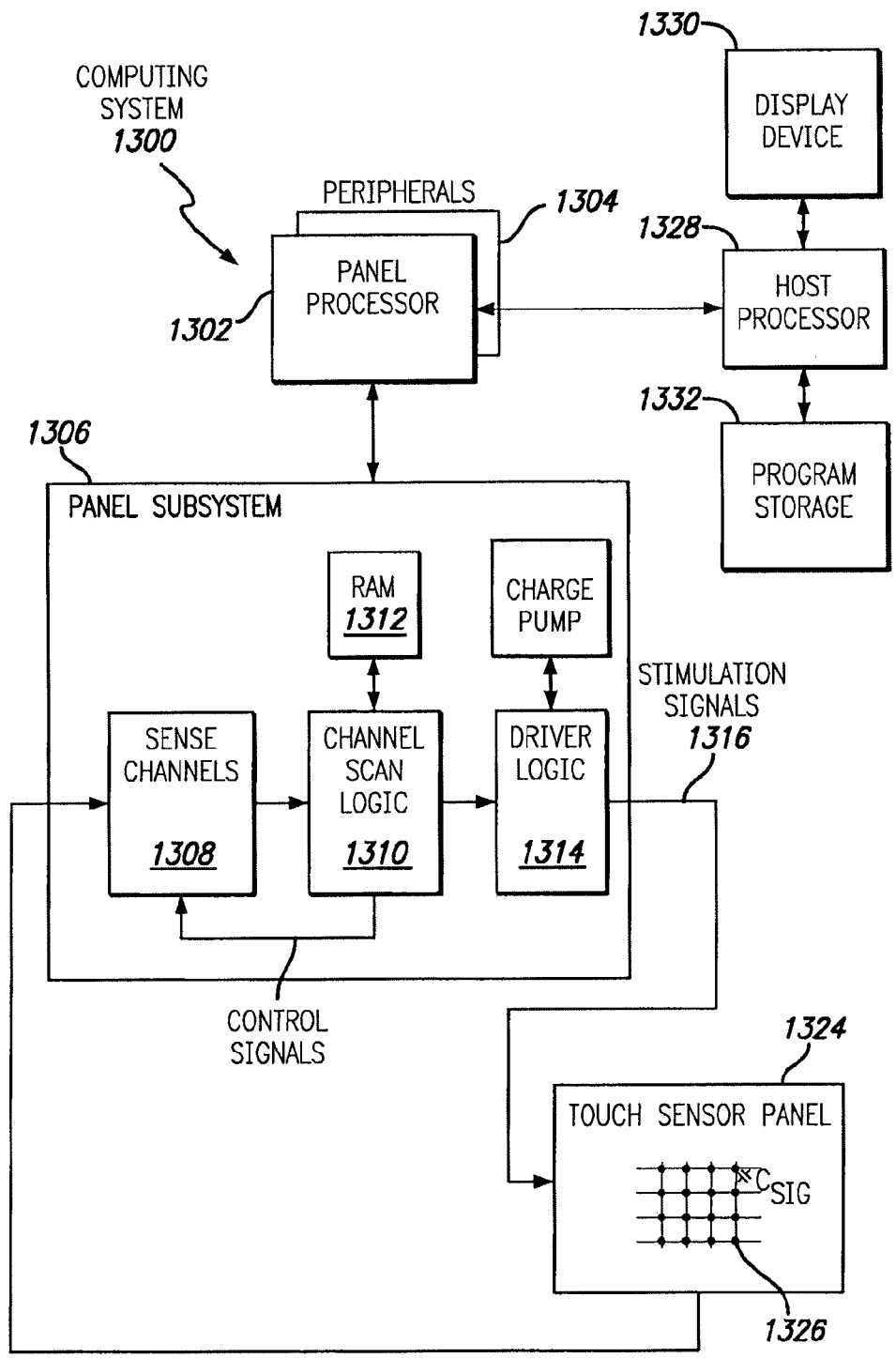
FIG. 13 illustrates an exemplary computing system that can include a touch sensor panel according to one embodiment of the disclosure.

FIG. 13 illustrates exemplary computing system 1300 that can include a touch sensor panel 1324 as in one or more of the embodiments described above. Computing system 1300 can include one or more panel processors 1302 and peripherals 1304, and panel subsystem 1306. Peripherals 1304 can include, but are not limited to, random access memory (RAM) or other types of memory or storage, watchdog timers and the like. Panel subsystem 1306 can include, but is not limited to, one or more sense channels 1308, channel scan logic 1310 and driver logic 1314. Channel scan logic 1310 can access RAM 1312, autonomously read data from the sense channels and provide control for the sense channels. In addition, channel scan logic 1310 can control driver logic 1314 to generate stimulation signals 1316 at various frequencies and phases that can be selectively applied to drive lines of touch sensor panel 1324. In some embodiments, panel subsystem 1306, panel processor 1302 and peripherals 1304 can be integrated into a single application specific integrated circuit (ASIC).

Touch sensor panel 1324 can include a capacitive sensing medium having a plurality of drive lines and a plurality of sense lines, although other sensing media can also be used. Each intersection of drive and sense lines can represent a capacitive sensing node and can be viewed as picture element (pixel) 1326, which can be particularly useful when touch sensor panel 1324 is viewed as capturing an "image" of touch. (In other words, after panel subsystem 1306 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitive sensing nodes can also be referred to as touch sensors or touch nodes. Each sense line of touch sensor panel 1324 can drive sense channel 1308 (also referred to herein as an event detection and demodulation circuit) in panel subsystem 1206.

Computing system 1300 can also include host processor 1328 for receiving outputs from panel processor 1302 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1328 can also perform additional functions that may not be related to panel processing, and can be coupled to program storage 1332 and display device 1330 such as an LCD display for providing a UI to a user of the device. Display device 1330 together with touch sensor panel 1324, when located partially or entirely under the touch sensor panel, can form touch screen 1318.

Note that one or more of the functions described above, can be performed, for example, by firmware stored in memory (e.g., one of the peripherals) and executed by the panel processor 1302, or stored in the program storage 1332 and executed by the host processor 1328. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 14A:
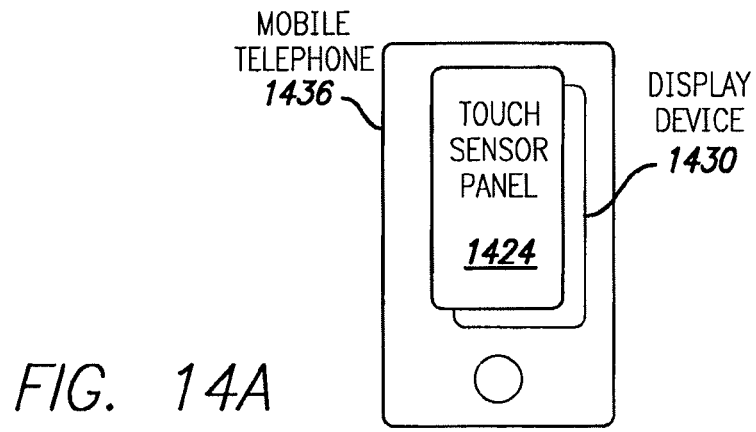
FIG. 14A illustrates an exemplary mobile telephone that can include a touch sensor panel and a display device according to embodiments of the disclosure.

FIG. 14A illustrates exemplary mobile telephone 1436 that can include touch sensor panel 1424 and display device 1430, the touch sensor panel calibrated for force effects as in one or more of the embodiments described above.

Figure 14B:
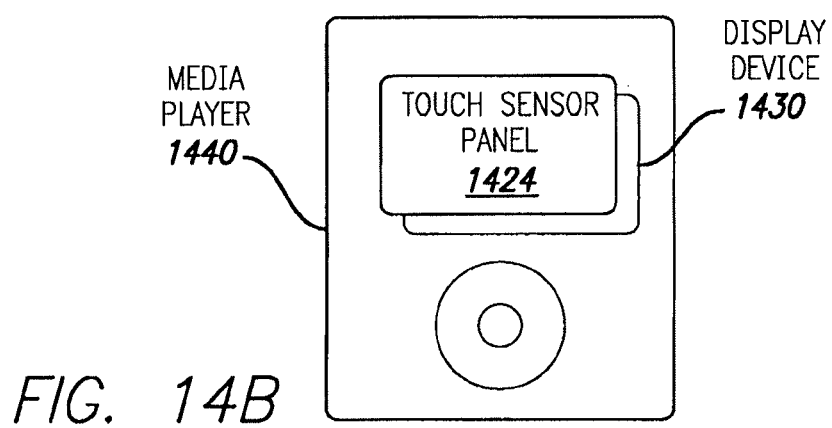
FIG. 14B illustrates an exemplary digital media player that can include a touch sensor panel and a display device, according to embodiments of the disclosure.

FIG. 14B illustrates exemplary digital media player 1440 that can include touch sensor panel 1424 and display device 1430, the touch sensor panel calibrated for force effects as in one or more of the embodiments described above.

Figure 14C:
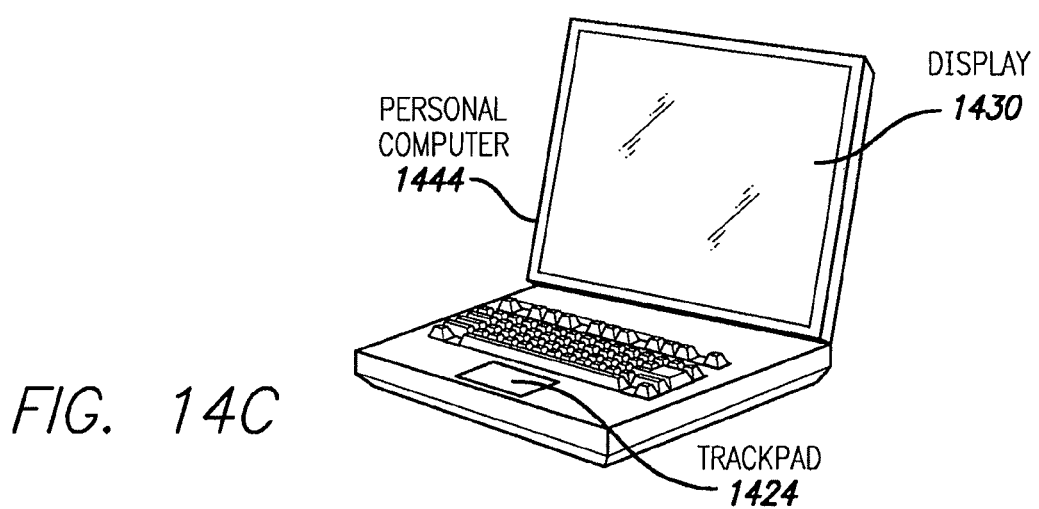
FIG. 14C illustrates an exemplary personal computer that can include a touch sensor panel (track pad) and a display, the touch sensor panel and/or display of the personal computer according to embodiments of the disclosure.

FIG. 14C illustrates exemplary personal computer 1444 that can include touch sensor panel (track pad) 1424 and display 1430, the touch sensor panel and/or display of the personal computer (in embodiments where the display is part of a touch screen) calibrated for force effects as in one or more of the embodiments described above.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A non-transitory computer readable storage medium having stored thereon a set of instructions for controlling a touch sensor panel comprising a plurality of touch nodes of the touch sensor panel sharing a common local oscillator, that when executed by a processor causes the processor to:
generate one or more stimulation signals to stimulate one or more drive lines by a drive circuitry;
operate a control logic for controlling a sense circuitry;
capture one or more first output values from one or more sense channels of the sense circuitry while the touch sensor panel is in a compressed state,
wherein the touch sensor panel includes a gap at least partially between a touch sensor stackup and a display stackup, the gap capable of being compressed when pressure is applied to the touch sensor panel such that at least one portion of the display stackup and at least one portion of the touch sensor stackup are closer together in the compressed state than in a non-compressed state;
capture one or more second output values from the one or more sense channels of the sense circuitry while the touch sensor panel is in the non-compressed state; and
configure the drive circuitry, the sense circuitry, or both to reduce a difference between the one or more first output values and the one or more second output values by setting the variable phase, frequency, or both of the common local oscillator to a value based on the one or more first output signal values and the one or more second output signal values associated with respective nodes of the plurality of touch nodes sharing the common local oscillator, the one or more first output values and the one or more second output values indicative of a substantially equivalent touch or no-touch input condition of the touch sensor panel, the touch or no-touch input condition associated with a proximity of a conductive object to the touch sensor panel.

2. The non-transitory computer readable storage medium of claim 1, wherein configuring the drive circuitry, sense circuitry, or both includes setting a phase of the one or more stimulation signals used to drive the touch sensor panel.

3. The non-transitory computer readable storage medium of claim 1, wherein configuring the drive circuitry, sense circuitry, or both includes selecting a phase value that represents a phase of the sense circuitry for which the one or more first output values and the one or more second output values are substantially same values.

4. The non-transitory computer readable storage medium of claim 1, wherein the phase of the sense circuitry is set by adjusting a phase setting of the local common oscillator of the sense circuitry.

5. The non-transitory computer readable storage medium of claim 1, wherein the phase of the common local oscillator is set to a value such that an error between the particular value and the phases of the plurality of touch nodes is less than a programmed error limit.

6. The non-transitory computer readable storage medium of claim 1, wherein the processor determines whether the difference between the one or more first output values and the one or more second output values is below a predetermined threshold.

7. The non-transitory computer readable storage medium of claim 1, wherein a common phase setting of the common local oscillator is set for the plurality of touch nodes sharing the common local oscillator.

8. The non-transitory computer readable storage medium of claim 7, wherein the common phase setting is set to a common phase value such that an error between the common phase setting at the common phase value and respective phases of each of the plurality of touch nodes is less than a programmed error threshold.

9. The non-transitory computer readable storage medium of claim 1, wherein for each respective node of the plurality of touch nodes sharing the common local oscillator, there is at least one corresponding phase setting of the common local oscillator used while sensing the respective node of the plurality of touch nodes sharing the common local oscillator, and at least two different phase setting values of the common local oscillator are used for sensing the plurality of touch nodes sharing the common local oscillator.

10. The non-transitory computer readable storage medium of claim 1, wherein the one or more first output signal values and the one or more second output signal values of the touch sensor panel sense circuitry are direct current (DC) values.

11. The non-transitory computer readable storage medium of claim 1, wherein the one or more first output signal values and the one or more second output signal values indicate a no-touch input condition.

12. The non-transitory computer readable storage medium of claim 1, wherein the one or more first output signal values and the one or more second output signal values indicate a touch input condition.

13. The non-transitory computer readable storage medium of claim 1, further comprising a demodulator circuit, wherein the demodulator circuit comprises the common local oscillator and a heterodyning circuit for producing direct current (DC) sensed signal values from alternating current (AC) sensed signal values,
wherein compression of the air gap causes a phase shift in one or more AC sensed signal values, and the one or more first output signal values and the one or more second output signal values comprise the DC sensed signal values.

14. The non-transitory computer readable storage medium of claim 1, wherein the configuration of the drive circuitry, sense circuitry, or both comprises setting a value of the variable phase, frequency or both of the common local oscillator, a same value being set when the touch sensor panel is in the compressed state and when the touch sensor panel is in the non-compressed state.

15. The non-transitory computer readable storage medium of claim 1, wherein the phase setting of the common local oscillator is set to provide a fixed phase relationship with a corresponding stimulation signal provided by the drive circuitry.

16. A touch sensor panel having a compressed state and a non-compressed state comprising:
a touch sensor stackup comprising:
a plurality of touch nodes;
drive circuitry for providing one or more stimulation signals to one or more drive lines; and
sense circuitry comprising a common local oscillator having a variable phase, frequency, or both, wherein the common local oscillator is common to the plurality of touch nodes, the sense circuitry configured for:
determining one or more output signal values indicative of a touch or no-touch input condition on the touch sensor stackup,
determining one or more first output signal values in the compressed state, and
determining one or more second output signal values in the non-compressed state, the one or more second output signal values indicative of a substantially equivalent touch or no-touch input condition as the one or more first output signal values, the touch or no-touch input condition associated with a proximity of a conductive object to the touch sensor panel,
wherein the drive circuitry, the sense circuitry, or both are configured to reduce a difference between the one or more first output signal values and the one or more second output signal values by setting the variable phase, frequency or both of the common local oscillator to a value based on the one or more first output signal values and the one or more second output signal values associated with respective nodes of the plurality of touch nodes sharing the common local oscillator;
a display stackup; and
an adhesive layer for attaching the touch sensor stackup and the display stackup, wherein a gap is formed at least partially between the display stackup and the touch sensor stackup, the gap capable of being compressed when pressure is applied to the touch sensor panel such that at least one portion of the display stackup and at least one portion of the touch sensor stackup are closer together in the compressed state than in the non-compressed state.

17. The touch sensor panel of claim 16, wherein the drive circuitry, the sense circuitry, or both are configured such that the one or more first output signal values and the one or more second output signal values are substantially same values.

18. The touch sensor panel of claim 16, wherein a common phase setting of the common local oscillator is set for the plurality of touch nodes sharing the common local oscillator.

19. The touch sensor panel of claim 18, wherein the common phase setting is set to a common phase value such that an error between the common phase setting at the common phase value and respective phases of each of the plurality of touch nodes is less than a programmed error threshold.

20. The touch sensor panel of claim 16, wherein for each respective node of the plurality of touch nodes sharing the common local oscillator, there is at least one corresponding phase setting of the common local oscillator used while sensing the respective node of the plurality of touch nodes sharing the common local oscillator, and at least two different phase setting values of the common local oscillator are used for sensing the plurality of touch nodes sharing the common local oscillator.

21. The touch sensor panel of claim 16, wherein the one or more first output signal values and the one or more second output signal values of the touch sensor panel sense circuitry are direct current (DC) values.

22. The touch sensor panel of claim 16 further comprising a demodulator circuit, wherein the demodulator circuit comprises the common local oscillator and a heterodyning circuit for producing direct current (DC) sensed signal values from alternating current (AC) sensed signal values,
wherein compression of the air gap causes a phase shift in one or more AC sensed signal values, and the one or more first output signal values and the one or more second output signal values comprise the DC sensed signal values.

23. The touch sensor panel of claim 16, wherein the configuration of the drive circuitry, sense circuitry, or both comprises setting a value of the variable phase, frequency or both of the common local oscillator, a same value being set when the touch sensor panel is in the compressed state and when the touch sensor panel is in the non-compressed state.

24. The touch sensor panel of claim 16, wherein a phase setting of the common local oscillator is set to provide a fixed phase relationship with a corresponding stimulation signal provided by the drive circuitry.

25. The touch sensor panel of claim 16, wherein the one or more first output signal values and the one or more second output signal values indicate a no-touch input condition.

26. The touch sensor panel of claim 16, wherein the one or more first output signal values and the one or more second output signal values indicate a touch input condition.

* * * * *